Oct. 2, 1934.  P. KLEIN  1,975,581

WELDING APPARATUS

Filed July 24, 1931

Inventor:
Pearce Klein,
by Charles E. Luller.
His Attorney.

Patented Oct. 2, 1934

1,975,581

UNITED STATES PATENT OFFICE 1,975,581

WELDING APPARATUS

Pearce Klein, Schenectady, N. Y., assignor to General Electric Company, a corporation of New York Application July 24, 1931, Serial No. 552,935

3 Claims. (Cl. 219—6)

My invention relates to welding apparatus in which the work is clamped between beams or holding members and a beam extending along opposite sides of the work by means acting against the beams, and more particularly to apparatus for welding long sections of small diameter pipe in which the size of the beam extending through the pipe is limited by the inside diameter of the pipe.

Various means may be employed for clamping the work between said members and beams. The clamping mechanism may be associated with any one or more of the holding members or beams, but I prefer to employ a construction such as shown in U. S. Patent No. 1,640,437, V. J. Chapman, for Electric welding, granted August 30, 1927, and assigned to the same assignee as the present case. In machines constructed in accordance with this patent, the work is clamped between holding members engaging one side of the work on opposite sides of the seam to be welded and a backing member arranged to engage the other side of the work in back of the seam which is forced into engagement with the work by a clamping mechanism reacting against a beam which furnishes a support for the same.

The size of pipes that can be welded on such machines depends on the dimensions of the beam supporting the backing bar and it is often necessary when welding long lengths of small diameter pipe to employ so light a beam that its deflection becomes too great to give the proper backing up of the seam from inside the pipe to make a successful weld. The size of the holding members or beams external to the pipe on the other hand are in no way limited by the size of the pipe to be welded.

It is an object of my invention to provide means supported by the holding members or beams external to the pipe for reinforcing at a point intermediate its length the beam about which the pipe fits.

It is a further object of my invention to provide means which may be readily attached to machines having the construction of the above noted patent for accomplishing this result.

Figure 1:
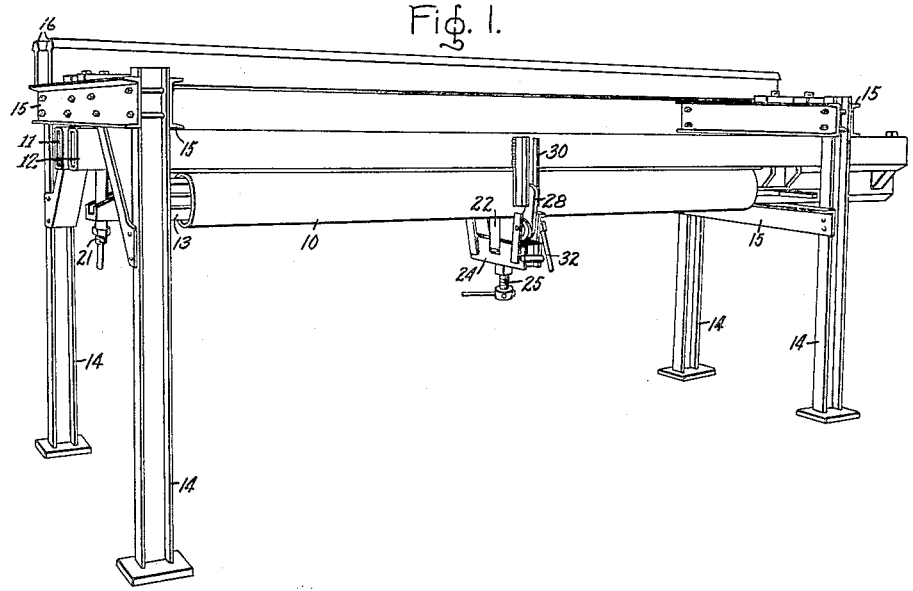
Figure 2:
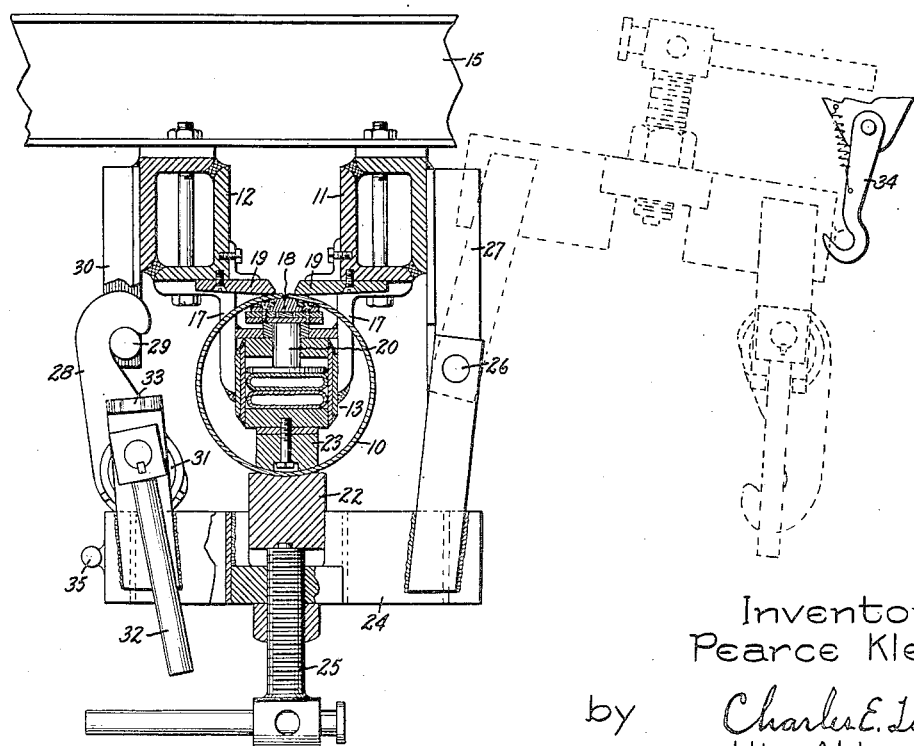

My invention will be better understood from the following description when considered in connection with the accompanying drawing, Fig. 1 of which shows a machine embodying my invention, and Fig. 2 of which is a sectional view of the machine shown in Fig. 1 illustrating the construction of the reinforcing means for the lower beam.

In the machine shown in Fig. 1 the work 10, a pipe, is clamped between two upper beams 11 and 12 and a lower beam 13. The upper beams 11 and 12 are supported at their ends in frames comprising uprights 14 and cross-bars 15. Rails 16 for a travel carriage (not shown) are also supported on these frames.

The lower beam 13 is supported in the machine at its right end by being attached to the right ends of the upper beams 11 and 12 by angles 17. This beam 13 furnishes a support for a backing member 18 between which the jaw members 19 attached to beams 11 and 12 the work is clamped by a clamping mechanism 20 such as illustrated in the above-identified Chapman patent. It will be noted that by employing this construction the lower beam 13 is required not only to support the clamping mechanism and the work, but also to withstand the reactionary forces of the clamping mechanism. The left-hand end of the lower beam 13 may be supported from the framework of the machine by a tie-bar 21 which may be swung from an operative position, such as illustrated in Fig. 1, to an inoperative position in which the space between the lower beam 13 and the upper beams 11 and 12 is unobstructed for the insertion and removal of work. The lower beam 13, however, due to the size of the pipe being welded may be so light that even though supported at its ends its deflection becomes so great as not to give the proper backing up of the seam throughout the length of the pipe. The size of beams 11 and 12, however, is in no way limited by the size of the pipe being welded, and in accordance with my invention these beams external to the pipe are used to support the beam inside of the pipe at a point intermediate its length by means attached to them and acting through the walls of the pipe on the beam inside of the pipe.

As shown in Fig. 2 this reinforcing means comprises a supporting block or shoe 22 which acts through the work 10 and a spacing block 23 attached to the lower beam 13 to reinforce the beam at that point. The supporting block 22 is adjustably mounted in a framework 24 through the agency of a screw 25. One end of the framework 24 is pivotally supported at 26 to members 27 attached to the upper beam 11 and the other end of the framework is supported by a hook 28 which in its operative position engages a bar 29 extending between members 30 attached to the upper beam 12. A clamping action is secured by means of a cam 31 which operates to force the supporting block 22 into engagement with the work 10 and spacer 23 when handle 32 is operated to the position illustrated in the drawing. When the handle 32 is moved to a position 180° from that illustrated, it engages a notch 33 forming part of the framework 24 in which position the clamping action is released and the hook 28 may be thrown out of engagement with the bar 29. The reinforcing means may then be moved about a pivot 26 to an inoperative position, illustrated by dotted lines in the drawing. It may be held in this inoperative position by a latch or hook 34 which is arranged to engage some part of the framework of the reinforcing means such as bar 35.

The machine is operated as follows:—With the reinforcing means described in the above paragraph occupying its inoperative position and the tie-bar 21 thrown to its inoperative position, the work is inserted over the lower beam 13 and adjusted thereon so that the seam is immediately over the backing member 18 and between the jaw members 19. The tie-bar 21 is then thrown to the position illustrated in Fig. 1 in which it supports the left-hand end of the beam 13. The reinforcing member is then placed in its operative position shown in Fig. 1 and in heavy lines in Fig. 2, in which it acts to reinforce lower beam 13 at a point intermediate its length. With the lower beam 13 thus reinforced, clamping mechanism 20 is operated to firmly clamp the work in the position shown in Fig. 2.

By employing different sized spacing blocks 23 and supporting blocks 22, the surface configurations of which conform to the inside and outside configuration of the pipe, it is possible to adapt one reinforcing mechanism to a large number of pipe sizes. It is not necessary to employ a cam mechanism such as shown in the particular arrangement illustrated in the drawing since the desired clamping action can be secured by means of the screw 25. Any number of reinforcing mechanisms according to my invention may be employed in any one machine depending upon the size and length of the pipe for which the machine is adapted. For extremely long pipes the holding members may comprise two or more longitudinally disposed beams and the means for supporting their adjacent ends.

The particular embodiment of my invention illustrated and described above has been selected for the purpose of clearly setting forth my invention. It will be apparent, however, that the invention is susceptible to being modified in many ways to meet the different conditions encountered in its use, and I therefore aim in the appended claims to cover all modifications within the true spirit and scope of my invention.

What I claim as new and desire to secure by Letters Patent of the United States is:

1. An attachment for pipe welding apparatus in which the pipe to be welded is clamped between beams extending along the inside and outside of the pipe by means acting against said beams comprising means acting in its operative position through the walls of said pipe for reinforcing a beam inside said pipe at a point intermediate its length, means for supporting said reinforcing means, means for pivotally attaching one end of said supporting means to a beam located outside of said pipe and latching means for adjustably attaching the other end of said supporting means to a beam located outside of said pipe and for moving said reinforcing means into its operative position.

2. An attachment for pipe welding apparatus in which the pipe to be welded is clamped between beams extending along the inside and outside of the pipe by means acting against said beams comprising means acting through the walls of said pipe for reinforcing the beam inside said pipe at a point intermediate its length, means for pivotally attaching one end of said reinforcing means to a beam located outside of said pipe, a latch for attaching the other end of said reinforcing means to a beam located outside of said pipe, cam means between said latch and said reinforcing means, and means for actuating said cam means to move said reinforcing means into operative position.

3. An attachment for pipe welding apparatus in which the pipe to be welded is clamped between beams extending along the inside and outside of the pipe by means acting against said beams comprising a spacer, means for attaching said spacer to one of said beams located inside said pipe, a shoe member, means for supporting said shoe member in registry with said spacer from said beams located outside said pipe, and means for adjusting said shoe member relatively to said supporting means.

PEARCE KLEIN.

---

CERTIFICATE OF CORRECTION.

Patent No. 1,975,581.   October 2, 1934.

PEARCE KLEIN.

It is hereby certified that error appears in the printed specification of the above numbered patent requiring correction as follows: Page 1, line 66, for "the" read and; and that the said Letters Patent should be read with this correction therein that the same may conform to the record of the case in the Patent Office.

Signed and sealed this 30th day of October, A. D. 1934.

Leslie Frazer (Seal)

Acting Commissioner of Patents.